United States Patent [19]

Silver

[11] Patent Number: 4,882,745
[45] Date of Patent: Nov. 21, 1989

[54] CORDLESS HEADSET TELEPHONE

[76] Inventor: Alan H. Silver, 130 NE. 41st St., Apt. #8, Ft. Lauderdale, Fla. 33334

[21] Appl. No.: 325,071

[22] Filed: Mar. 20, 1989

Related U.S. Application Data

[63] Continuation of Ser. No. 50,700, May 8, 1987, abandoned.

[51] Int. Cl.⁴ .............................................. H04Q 7/04
[52] U.S. Cl. ........................................ 379/61; 455/90; 381/183
[58] Field of Search ........................ 379/61, 62, 63, 56; 455/90; 381/183

[56] References Cited

U.S. PATENT DOCUMENTS

| | | | |
|---|---|---|---|
| 3,889,190 | 6/1975 | Palmer | 325/16 |
| 3,916,312 | 10/1975 | Campbell | 325/16 |
| 4,122,304 | 10/1978 | Mallien II | 379/63 |
| 4,340,972 | 7/1982 | Heist | 455/39 |
| 4,481,382 | 11/1964 | Villa Real | 379/61 |
| 4,484,029 | 11/1984 | Kenney | 179/2 |
| 4,491,699 | 1/1985 | Walker | 179/156 |
| 4,591,661 | 5/1986 | Benedetto et al. | 379/58 |
| 4,634,810 | 1/1987 | Grassl et al. | 379/61 |
| 4,640,987 | 2/1987 | Tsukana et al. | 379/62 |
| 4,650,931 | 3/1987 | Tsukada et al. | 379/61 |
| 4,706,274 | 11/1987 | Baker et al. | 379/61 |
| 4,731,812 | 3/1988 | Akerberg | 379/61 |
| 4,768,218 | 8/1988 | Yorita | 379/61 |

FOREIGN PATENT DOCUMENTS

0126690  11/1984  European Pat. Off. ............ 381/188

*Primary Examiner*—Robert Lev
*Attorney, Agent, or Firm*—Oltman and Flynn

[57] ABSTRACT

Cordless headset telephone system including at least one headset having at least one earpiece, a swingout microphone and a headset transmitter and receiver connected to a common antenna, at least one base having a base transmitter and receiver having a common antenna, respectively tuned to the headset transmitter and receiver, and apparatus included in the base circuit for seizing at least one telephone line.

26 Claims, 7 Drawing Sheets

CORDLESS HEADSET TELEPHONE

This application is a continuation of application Ser. No. 07/050,700, filed 05/18/87 now abandoned.

BACKGROUND AND OBJECTS

The invention relates to telephone apparatus, and more particularly to one or more headsets with one or more bases for a cordless telephone telecommunications system.

In using a cordless telephone of the conventional type having a hand-held handset with an antenna and built-in radio transmitter and receiver, it has been found that it is inconvenient to carry around such a handset. It is therefore a primary object of the invention to overcome this inconvenience by providing a cordless telephone instrument formed as a headset with built in transmitter and receiver apparatus, which can be placed on the head of a user, who thereby has both hands free to do tasks other than carrying a cordless telephone.

It is another object to provide such a telephone that has a base part with a built-in charger for charging at least one interchangeable spare battery, and corresponding radio or infrared receiver and transmitter.

SUMMARY OF THE INVENTION

The invention includes one or more headsets having at least one earpiece and a microphone attached thereto, a built-in radio frequency transmitter and receiver connected to an antenna, or an infrared light-emitting transmitting and receiving apparatus, a detachable rechargeable battery pack for supplying power to the headset and one or more bases having a cradle for storing the headset thereon, and a pair of charging contacts for providing electrical connection between the headset and the base, a base transmitter and receiver with antenna built into the base for communicating with the headset transmitter and receiver and a battery charger for charging the headset battery pack while the headset is stored on its cradle at the base.

According to still another feature, the base has means for communicating with a local switching network, manual operator or a telephone exchange, and/or for extending the connection to the headset.

According to a further feature, the base has charge capacity for charging at least one detachable spare battery pack within a storage compartment 107 disposed within the base.

According to still another feature the headset telephone and the base each include an electronic telephone directory/autodialler having an electronic memory, keypad and display panel. These will enable the user to enter, edit and view the names and corresponding telephone numbers of frequently called parties and to dial the selected party by depressing a "dial" button. Additionally, a headset page button and a base page button are connected to call-tone oscillators in engagement with the base and headset transmitters respectively for generating a page tone to be heard at the headset and base respectively.

According to still another feature, the base includes a telephone handset and/or a speakerphone enabling a user at the base to communicate with the user having the headset and/or the telephone exchange.

According to still another feature, several base and/or headset units may be networked together allowing multiuser, multi-link operation.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
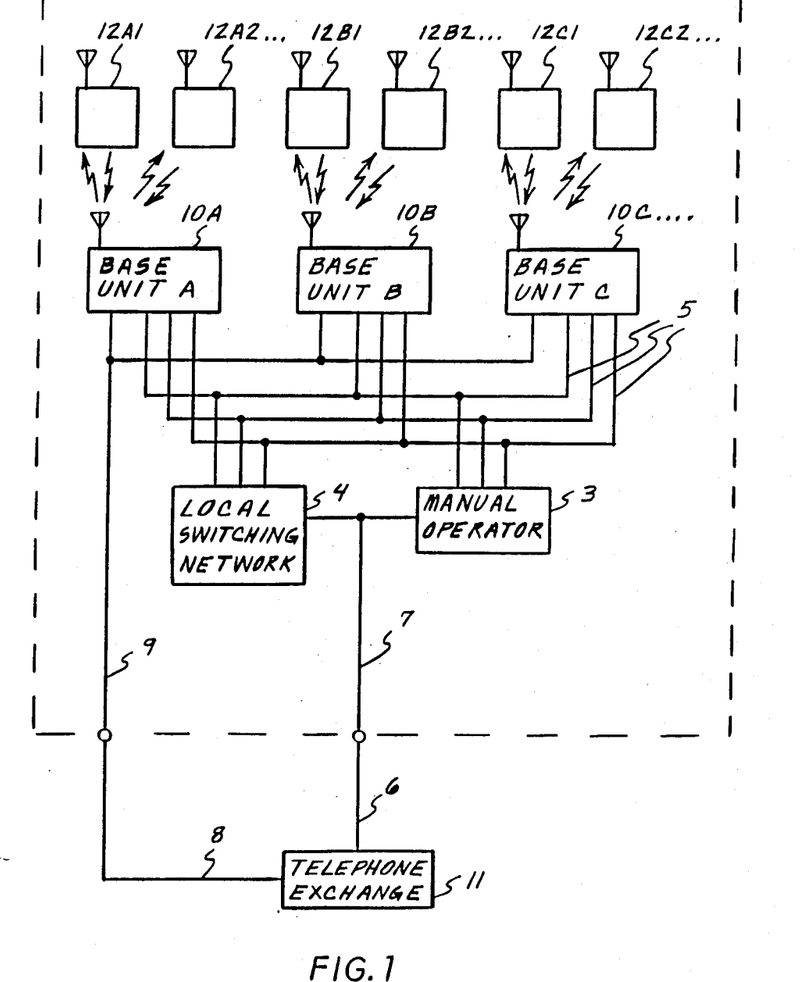
FIG. 1 is a block diagram of a cordless headset telephone system showing the functional blocks of the headsets and the bases, and their connection to a telephone exchange for both single and multi-line service.

Referring now especially to FIG. 1, which gives a block diagram of a system using several cordless headset telephone units and shows several bases 10A, 10B, 10C, etc. connected by a conventional two wire local telephone line 9 via a conventional two wire exchange telephone line 8 to a conventional telephone exchange 11. The headsets 12A1, 12A2 etc., 12B1, 12B2 etc., 12C1, 12C2 etc. are constructed to be placed on the head of the users for communicating by a radio frequency or infrared light connection with the bases 10A, 10B, 10C etc. which are in turn capable of communicating with outside parties via the local telephone line 9 to the exchange telephone line 8, or the local telephone multi-line 7 to the exchange telephone multi-line 6 to the telephone exchange 11.

Multi-user, multi-link communication between two or more headsets 12A1 ... 12C2 via the headset multi-line controller 32 (FIG. 2) or between two or more bases 10A ... 10C is possible via the local network multi-line 5, and the local switching network 4 or the manual operator 3.

In order to simplify the remainder of the following detailed description, any headset 12A1, 12A2 etc., 12B1, 12B2 etc., 12C1, 12C2 etc. and its corresponding base 10A, 10B, 10C etc. will be represented by a single headset and a single base, hereinafter to be referred to as "headset 12" and "base 10" respectively. Additionally, any reference made to the "local telephone line 9" in any description of the speakerphone 20 or the base handset 112 will be equivalent to "the line selected by the line select/hold switches and status indicators 38" in the case of multi-line usage. Also, any reference made to the "local telephone line 9" in any description of the "headset 12" will be equivalent to "the line or lines selected on the local network multi-line 5 via the headset multi-line controller 32 and the line coder/decoder 2", in the case of multi-line usage.

Figure 2:
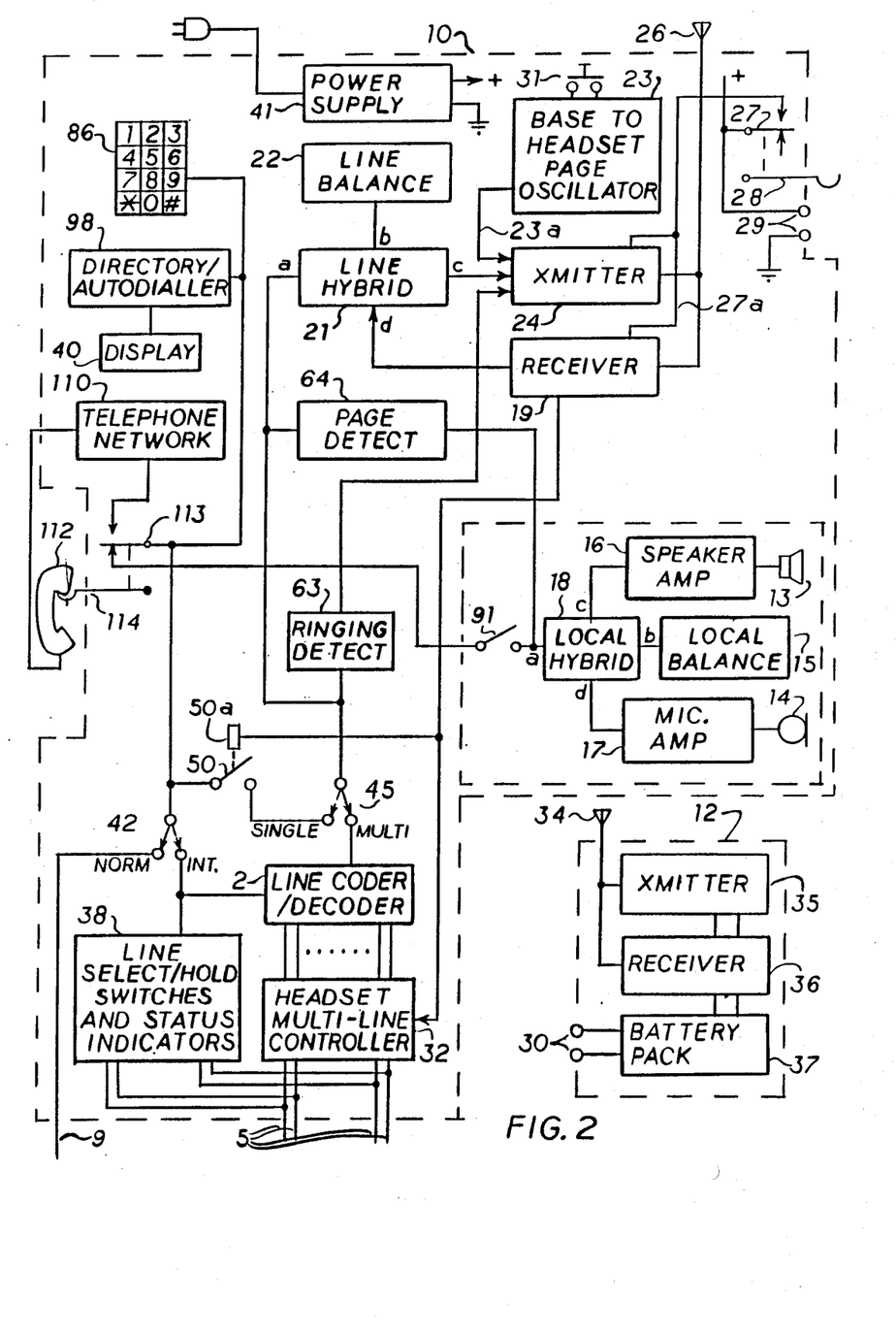
FIG. 2 is a block diagram of the cordless headset telephone showing the function blocks of a headset and a base.
Figure 7:
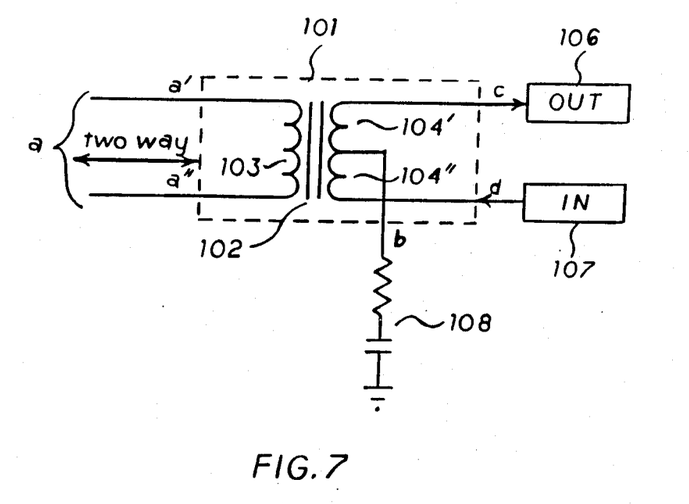
FIG. 7 is a diagram of a telephone hybrid circuit.

Referring to FIG. 2, the base 10 includes a speakerphone and a handset 112. The speakerphone speaker 13 is connected to a speaker amplifier 16 in turn connected to pin c of a local hybrid circuit 18. The local hybrid 18 is a conventional communications circuit used for connecting a two-way signal source at pin a with two one-way signal sources c and d. FIG. 7 shows a typical version of a hybrid circuit 101 which is conventional and which is applicable to the instant invention. In FIG. 7 the hybrid 101, shown inside a dashed-line box, consists of a transformer 102 having a primary winding 103 connected via pins a' and a" to a balanced two-way signal source such as a conventional telephone line, a secondary centertapped winding consisting of two balanced half-windings 104' and 104" forming a one-way outgoing signal at pin c and receiving a one-way incoming signal at pin d. A line balance 108, typically consisting of a capacitor and a resistor matching the two-way line in impedance, serves to separate the incoming and outgoing signals. The pin designations of the hybrid 101 are the same as those shown in the other figures. Returning to FIG. 2, the speakerphone microphone 14 is connected to a microphone amplifier 17, in turn having its output connected to pin d of the local hybrid 18. At the two-way pin a (consisting of pins a' and a", but shown as a single pin a for clarity) the local hybrid 18 is connected to the local telephone line 9 through a manually controlled speakerphone on-off hook switch 91, the handset on-off hook switch 113, and the normal/intercom mode switch 42 or to the local network multi-line 5 via the line select/hold switches and status indicators 38. The local hybrid 18 is connected to a local balance 15 serving to balance the local telephone line 9 and the local network multi-line 5. The local hybrid 18 serves to separate the speakerphone speaker 13 from the speakerphone microphone 14 to minimize acoustic feedback and instability caused by acoustic coupling between them.

A second hybrid, the line hybrid 21, serves to combine the signals from the base receiver 19 and the base transmitter 24. The base receiver 19 is connected to the line hybrid one-way input d and the base transmitter 24 is connected to the line hybrid one-way output pin c. The line hybrid 21 is in turn connected at its pin a to the local telephone line 9 via the single/multi-line select switch 45 and the headset line control relay contact 50, or to the local network multi-line 5 via the single/multi-line select switch 45, the line coder/decoder 2 and the headset multi-line controller 32. A line balance 22 provides balance with the impedance of the local telephone line 9 and the local network multi-line 5. The line hybrid 21 also serves to isolate the radio transmitter 24 from the radio receiver 19 so that feedback through their common antenna 26 is avoided.

The handset 112, when removed from the handset cradle 114, is connected to the local telephone line 9 via a conventionnal telephone network 110, the handset on-off hook switch 113, and the normal/intercom mode switch 42, or by the local network multi-line 5 via the line select/hold switches and status indicators 38.

The base receiver 19 and the base transmitter 24 are tuned to the respective frequencies of the headset transmitter 35 and headset receiver 36. The headset has an antenna 34 connected to both the headset transmitter 35 and the headset receiver 36, and a headset battery pack 37 for powering the headset. The headset 12 has two headset disposed battery charging contacts 30 which serve to charge the headset battery when the headset is at rest on the headset cradle 28, having base disposed battery charging contacts 29 for charging the headset battery, when the headset is at rest thereon. When the headset 12 is removed from the headset cradle 28, a headset on-off hook switch 27 is closed to activate the base transmitter 24 and the base receiver 19 via lead 27a.

The base receiver 19 is connected to the headset line control relay coil 50a and to the headset multi-line controller 32. When the line select switch 45 is in the "single" position and the base receiver 19 receives a carrier signal from the headset transmitter 35 in headset 12, the local telephone line 9 is seized via the headset line control relay contacts 50, activated by the headset line control relay coil 50a via an output from the base receiver 19. When the line select switch 45 is in the "multi-line" position, and the base receiver 19 receives a carrier signal from the headset transmitter 35 in headset 12, the local network multi-line 5 is seized via the headset multi-line controller 32 and the line coder/decoder 2 via an output from the base receiver 19.

The base 10 includes a page oscillator 23 connected with its output to an input of the base transmitter 24 and with its input to a base to headset call button 31, which, when depressed, activates the page oscillator 23 and the base transmitter 24 to transmit a radio signal to be received by the the headset receiver 36 for alerting a person carrying a headset 12.

When the normal/intercom mode switch 42 is in the "intercom" mode, and the single/multi-line switch 45 is in the "single" line position, the line hybrid 21 is connected with its two-way pin a to the corresponding pin a of the local hybrid 18 via the single/multi-line switch 45 via the headset line control relay contact 50 via the handset on-off hook switch 113. When the single/multi-line switch is in the "multi" line position the line hybrid 21 is connected with its two-way pin a to the corresponding pin a of the local hybrid 18 via the line coder/decoder 2, via the normal/intercom mode switch via the handset on-off hook switch 113. In this mode, the person carrying a headset can communicate with a person at the base through the circuit formed by the base transmitter 24, the base receiver 19, the line hybrid 21, and the local hybrid 18, the speaker amplifier 16, the microphone amplifier 17, the speakerphone speaker 13, and microphone 14, or alternatively via the telephone network 110 and handset 112. In the intercom mode the local telephone line 9 is disconnected at the normal/intercom mode switch 42. Any unused local network multi-lines are disconnected at the headset multi-line controller in this and all other modes as well. In the other mode, "Normal", when the single/multi-line select switch 45 is in the single position, the normal/intercom mode switch 42 allows a connection between the local telephone line 9, pin a of the line hybrid 21 and pin a of the local hybrid 18 or the input of the telephone network 110 so that a person carrying the headset 12 or a person on the speakerphone or handset 112 can converse with a person connected to the telephone line 9 through the exchange 11.

At least one power supply 41 connected to an outside power source PS provides power to all circuits on the base as well as charge current for charging the headset and the auxiliary battery packs through contacts 29, 30 and 96.

Figure 3:
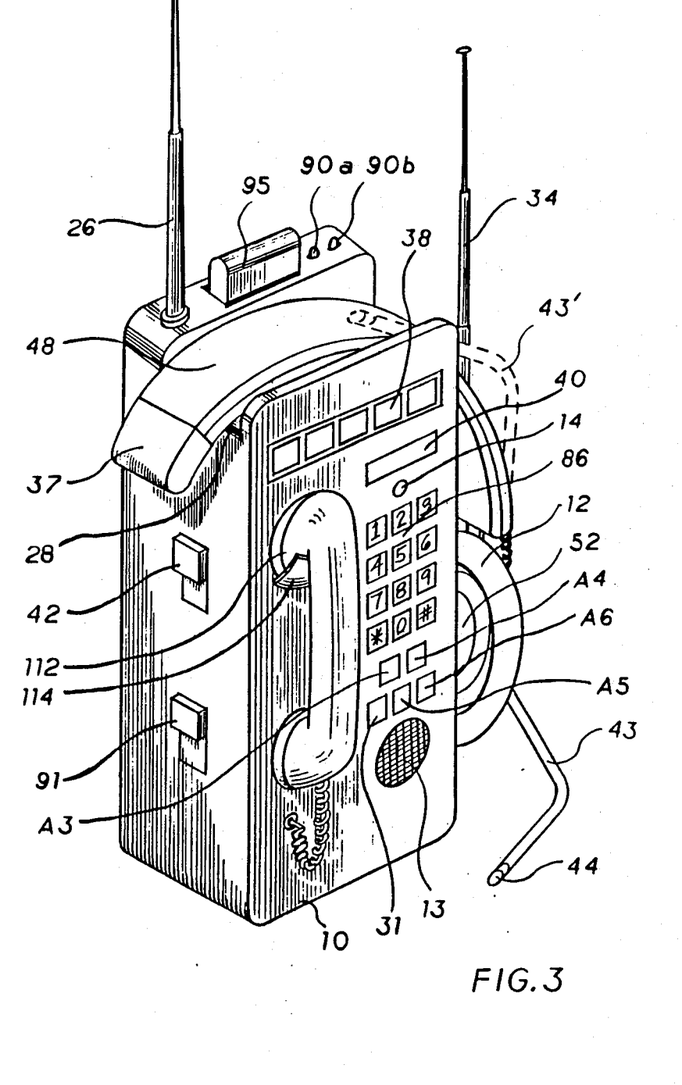
FIG. 3 is a perspective view of a cordless headset telephone showing the headset, the base, and other details thereof.

FIG. 3 shows the front panel of the base 10, with the headset 12 placed on the headset cradle 28. The headset microphone 44 is mounted on a swing-out arm 43, also shown in its inactive position 43' in dashed lines, the earpiece 52 and a detachable rechargeable battery pack 37, conveniently attached to the distal end of the head band 48. FIG. 3 also shows the grille of the speakerphone speaker 13 and the speakerphone microphone 14, the headset call or page button 31, the normal/intercom mode switch 38, the alphanumeric display 40 and a base keypad 86 for dialling a telephone number of a telephone to be called from the base. Additional keys for cancel A3 to temporarily disconnect the line, redial A4 to redial last number dialed, mute A5 to disconnect the headset microphone, and electronic directory/autodialler program mode A6 are also provided. These keys may also be provided on the headset of FIG. 6. Two charge status indicators 90a and 90b serve to indicate the charge status of an auxiliary battery pack 95 mounted within the auxiliary battery pack charging compartment 107 and the headset battery pack 37 respectively, using well known circuit means.

The handset 112 is seen mounted on the handset cradle 114 at the left hand side of the base 10.

Figure 4:
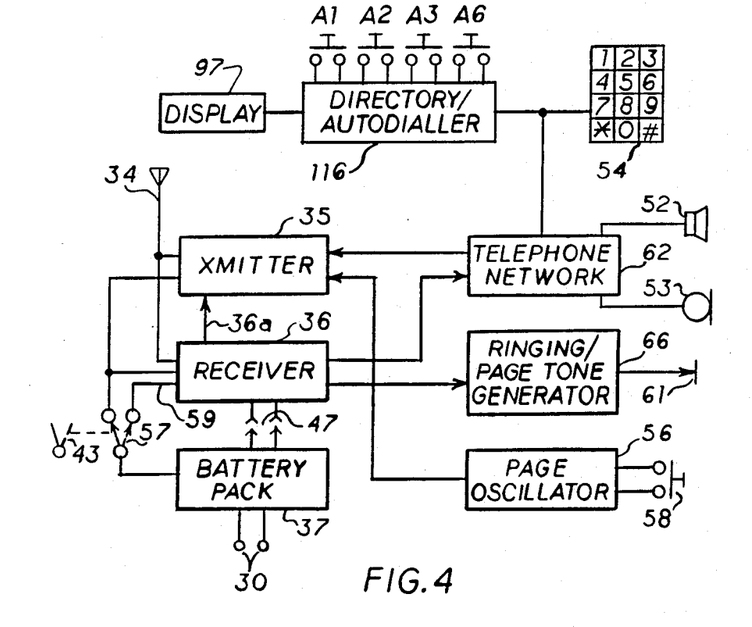
FIG. 4 is a more detailed block diagram of the headset circuit.

FIG. 4 shows circuit details of the headset 12, including the afore-described headset transmitter and receiver 35, 36; the headset battery pack 37 and the antenna 34, and furthermore the headset keypad 54 for dialling telephone numbers from the headset and for accessing the electronic directory/autodialler 116 containing memory, display driver and associated electronics, the contents of which may be viewed on the alphanumeric display 97, a telephone network 62, which is a conventional network commonly used in cordless telephones, which is used for combining the headset microphone 53, the headset earpiece 52 and the headset keypad 54, and which includes the digit-sending circuit that sends the dialled number in either dual-tone multifrequency signals (known as DTMF) or in strings of dial pulses. Such telephone networks are well known and need not be described in more detail since the invention is not directed to this detail. A page oscillator 56 is also shown, having a headset to base page button 58. The page oscillator 56 serves to generate an audible tone at the base when the headset to base page button 58 is depressed. The page oscillator 56 connected to the headset transsmitter 35 and activates and modulates its RF-carrier so that a corresponding audible tone is heard at the base 10 in the basespeaker 13, via the base receiver 19, the line hybrid 21, the page detect circuit 64, the local hybrid 18, the speaker amplifier 16 and the base speaker 13. A ringing/page tone generator 66 is connected with its input to the headset receiver 36 and with its output to a audio transducer 61. Audible ringing and page signals are generated either when an incoming ringing signal is received from the local telephone line 9 of the local network multi-line 5 via a ringing detect circuit 63, seen in FIG. 2, or when a base to headset page signal is received from the base to headset page button 31 via the base to headset page oscillator 23 having ringing and paging outputs connected to the page transmitter 24. The ringing detect circuit is adapted to respond to a ringing signal on the local line 9 of the local network multi-line 5 to announce an incoming call. The ringing signal from the ringing detector 63 or a paging signal from the base to headset page oscillator 23 turns on the base transmitter 24 and modulates it with an audible tone so that a corresponding tone is received in the ringing/page tone generator 66 of the headset which in turn energizes the transducer 61 to produce a ringing or paging tone audible to the person carrying the headset 12. The microphone arm 43 is mechanically linked to a switch 57 which serves to disconnect all the circuits in the headset except the headset receiver 36 and the ringing/page tone generator 66, when the swing-out microphone arm 43 is swung into its inactive position 43', seen in FIG. 3. The power for the standby ringing operation is provided by a power by-pass link 59 from the headset battery pack 37 to the headset receiver 36. When the headset receiver 36 receives RF-carrier from the base transmitter 24 and the person at the headset places the microphone swingout arm 43 into the active position, the headset standby-on switch 57 or a transmitter-start signal via lead 36a enables the headset transmitter 35, which in turn sends its RF-carrier to the base receiver 19 which activates the headset line control relay coil 50a and contacts 50 as described above.

Figure 5:
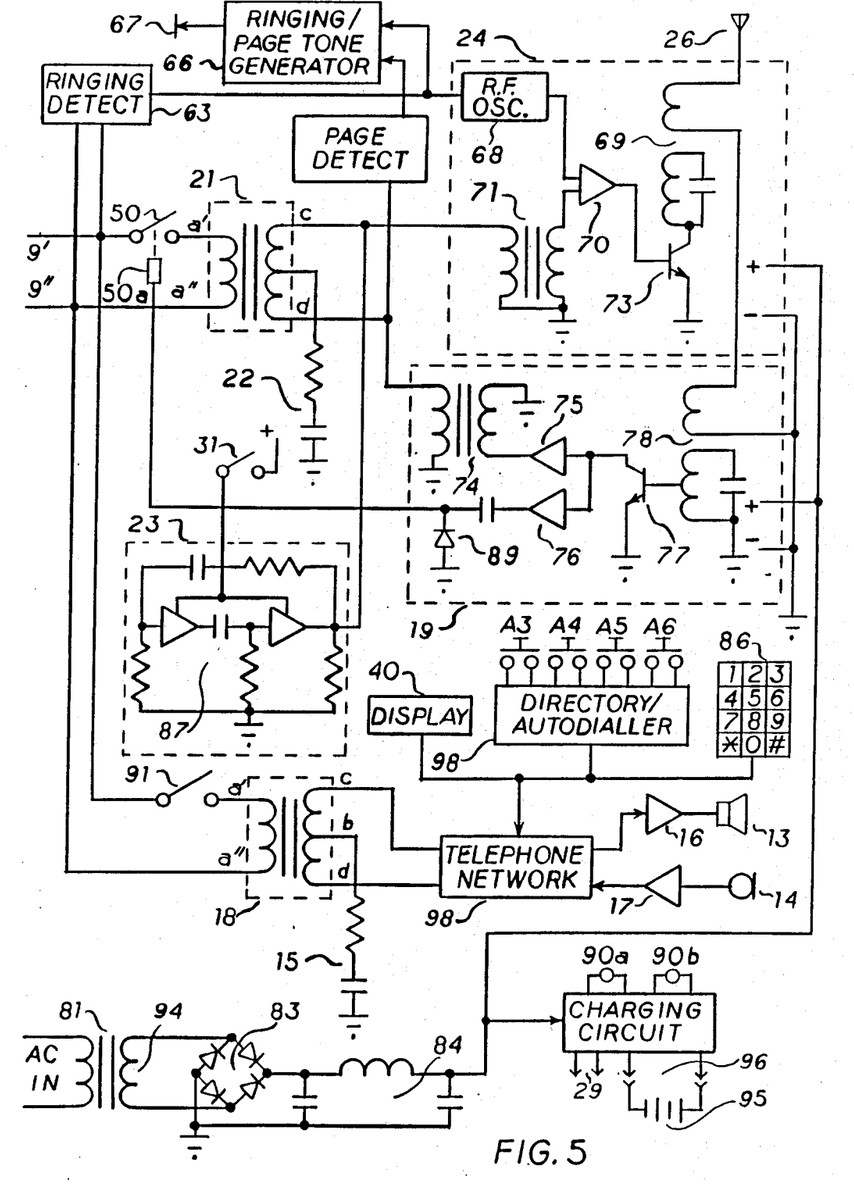
FIG. 5 is a more detailed diagram of the base circuit showing the various function blocks and their interconnections.

FIG. 5 showns the circuit of the base 10 with some additional details not seen in FIG. 1. Those details also shown in FIG. 2 have the same reference numbers, and will not be further described in the following. The local telephone line 9 is shown with its two conductors 9' and 9" coming from the telephone exchange connected to the line hybrid 21, pins a' and a", via the headset line control relay contact 50 connected to the headset line control relay coil 50a, which is in turn connected to the base receiver 19. The base receiver 19 is shown with only a few of its parts since its construction is conventional and well known. The base receiver 19 receives its signal from the base antenna 26 via a tuned circuit 78 connected to the receive circuit 77, shown symbolically as a transistor, which represents all the circuits normally provided in a radio receiver which are well known. The output of the receive circuit 77 is connected to an audio amplifier 75, connected to an output transformer 74 connected to the input pin d of the line hybrid 21. The base receiver 19 has a radio frequency amplifier 76 connected to a rectifier circuit 89, which is in turn connected to the headset line control relay coil 50a closing the headset line control relay contact 50a, when the base receiver 19 receives a radio carrier from the headset transmitter 35. When the headset line control relay contact 50 closes, a seizure signal, also known as an off-hook signal is sent to the telephone exchange over the line 9' and 9", due to a current loop through the primary winding of the line hybrid 21 being closed, in conventional manner. The exchange sends dial tone, which is transmitted to the headset earpiece 52. The person at the headset can dial a number from his keypad 54 (FIG. 3) or access the electronic directory/autodialler 116 to do so, and upon being connected receive ringback tone from the distant dialled party in conventional manner and converse with the party. The voice and call progress tones received from the exchange are separated in the line hybrid 21 and sent, via pin c, to the input of the base transmitter 24 via an input transformer 71 and a transmit amplifier 70 which symbolically represents all the conventional radio frequency amplifiers. An RF-oscillator 68 sends a radio frequency signal to another input of the transmit amplifier 70. The audio frequency signal modulates the radio frequency signal in conventional manner, using any one of several well-known modulation methods. The base transmitter out-put stage is shown symbolically as a transistor 73, driving a tuned antenna circuit 69 coupled to the base antenna 26.

FIG. 5 also shows the ringing detect circuit 63 and the page detect circuit 64 connected to a ringing/page tone generator 66 coupled to a ringing transducer 67 similar to the ringing/page tone generator 66 and transducer 61 described for the headset circuit. These circuits enable a person at the base to hear incoming ringing and paging tones in order that he may respond by operating either the speakerphone on-off hook switch 91 mounted on the base front panel, or removing the handset 112 from the handset cradle 114 to answer an incoming call. In order to originate an outgoing call the person at the base removes the handset from the handset cradle 114 or engages the speakerphone on-off hook switch 91 into the off hook position and dials the called number on keypad 86 or accesses the electronic directory/autodialer 98 to do so from keypad 86 connected to a telephone network or similar circuit 79, serving to combine the speaker 13, the microphone 14 and the keypad 86 in conventional manner.

The base circuit includes at least one power supply 41 described earlier and seen in more detail in FIG. 5, showing an AC-power transformer 81, having at least one secondary winding 94 driving at least one rectifier bridge 83, which supplies power for the base circuit and charging circuit via at least one filter 84. The battery charging circuit is also arranged to supply charging current to a chargeable auxiliary battery pack 95 conveniently stored in the auxiliary battery pack charging compartment 107 (FIG. 6), via contacts 29 in the base unit, as seen in FIGS. 2 and 5.

Figures 6, 6A:
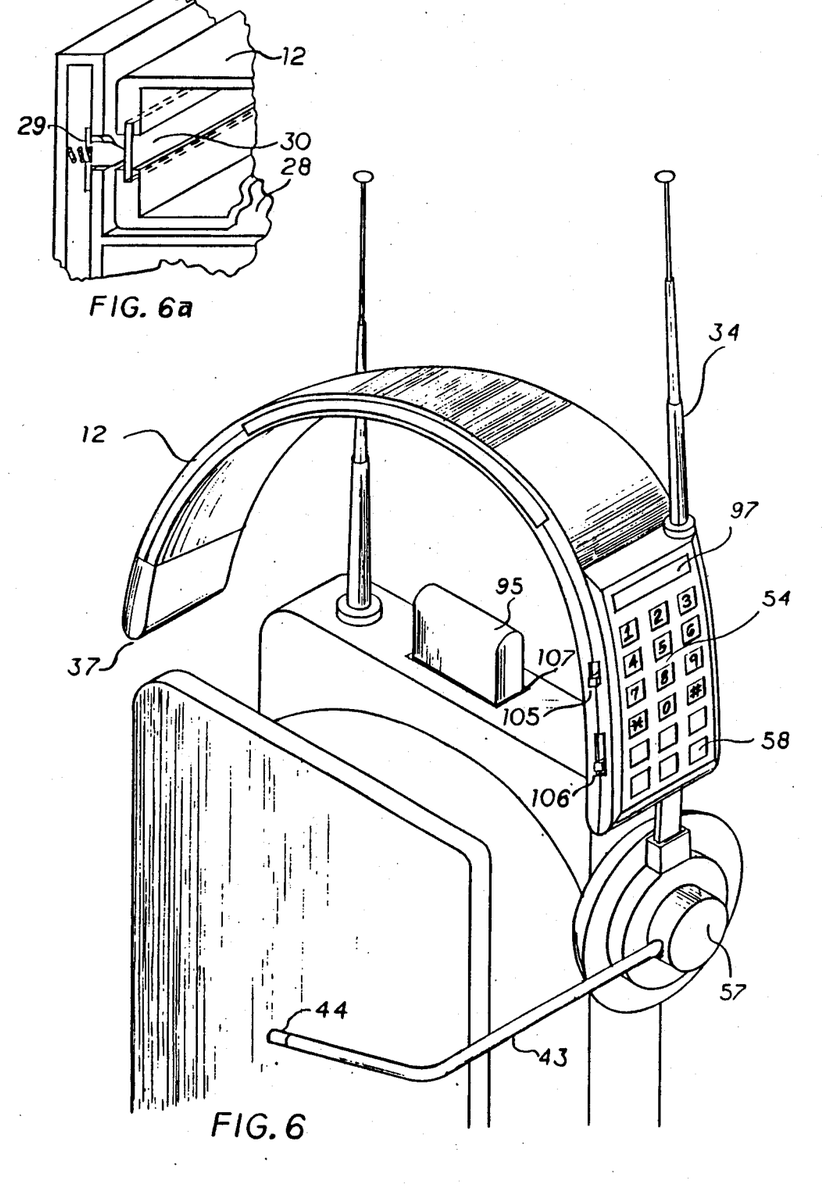
FIG. 6 is another perspective view of the headset in the headset cradle, showing a set of charging contacts, and the keypad for dialling telephone numbers and the auxiliary battery pack in its charging compartment.
FIG. 6a is a fragmentary detail of the headset charge contacts.

FIG. 6 is a perspective view of the headset taken from the opposite side of the one shown in FIG. 3. FIG. 6 shows the headset keypad 54 for dialling called numbers, the alphanumeric display 97, the base call button 58, the standby-off switch 105, the volume control 106, the standby-on switch 57, mechanically linked to the swingout microphone arm 43, and the headset disposed battery pack charging contacts mating with the base disposed battery charging contacts 29 of the cradle 28, shown only in part in FIG. 6a.

FIG. 6a is a fragmentary view of the handset disposed battery pack charging contacts 30 in the headset 12 engaging the mating base disposed battery charging contacts 29 in the headset cradle 28.

I claim:

1. A cordless headset telephone system comprising: at least one headset and at least one base, each including transmitter means and receiver means for providing a two-way cordless transmission between the headset and the base, each headset being balanced and having a minimum inertial moment, and including a curved headband, a quick-disconnect battery pack attached to one end portion of the headband, a single earpiece attached to the other end portion of the headband, and a microphone respectively connected to a headset receiver and a headset transmitter, a forwardly extendable microphone arm having the headset microphone mounted thereon, each base having a base receiver and base transmitter respectively connected to an audio output and an audio input.

2. A cordless headset telephone according to claim 1, including line connecting means for connecting the base to a telephone line, and telephone number sending means in operative engagement with said telephone line for sending telephone numbers into said line.

3. A cordless headset telephone according to claim 2, wherein said line connecting means include a line hybrid having a two-way input connected to the telephone line, a one-way input connected to a receiver output, a one-way output connected to a transmitter input, and a line balance connected to the line hybrid for balancing the line impedance.

4. A cordless headset telephone according to claim 2, including line seizure means for activating the telephone line in the base in response to an output from the base receiver.

5. A cordless headset telephone according to claim 2, including a ringing detect circuit connected to the telephone line for detecting a ringing signal on the telephone line, the base transmitter having a ringing input connected to the ringing detect circuit for transmitting a ringing indication to the headset receiver, and a ringing transducer in the headset connected to the headset receiver for generating an audible ringing signal from the headset.

6. A cordless headset telephone according to claim 2, including a keypad in the headset for dialling telephone numbers from the headset, wherein said microphone arm is a microphone swingout arm, a headset standby-on switch linked to the swingout arm for activating the headset transmitter in response to the swingout arm being swung out.

7. A cordless headset telephone according to claim 2, including a rechargeable battery, detachably connected to the headset for providing its operating power.

8. A cordless headset telephone according to claim 2, including a call tone generator connected to the headset transmitter and a call button connected to the call tone generator for generating a call tone being audible at the base.

9. A cordless headset telephone according to claim 1 including a cradle disposed at the base for resting the headset thereon, a battery charge circuit disposed at the base, a pair of charge contacts disposed in the cradle connected to the charge circuit, a pair of charge contacts disposed on the headset in mating engagement with the base charge contacts when the headset is placed on the cradle for charging the headset battery pack.

10. A cordless headset telephone according to claim 9 including a base circuit start switch with start circuitry disposed in the base in operative engagement with the base circuit for activating it upon removal of the headset from the bracket.

11. A cordless headset telephone according to claim 2 including a handset connected to the base, normal/intercom switching means having at least a normal state for providing a two-way voice connection between the headset and the telephone line, and an intercom state for providing a two-way voice connection between the headset and the base.

12. A cordless headset telephone according to claim 2, including a handset connected to the base, a loudspeaker, a microphone, a local hybrid in the base having a two-way voice input connected to the telephone line, a one-way output connected to the loudspeaker and a one-way input connected with the microphone output.

13. A cordless headset telephone according to claim 12, having a call tone oscillator disposed at the base, and a call button in engagement with the oscillator for generating a call tone being audible at the headset.

14. A cordless headset telephone according to claim 11, including a normal/intercom mode switch in the base in operative engagement with the base circuit for connecting the loudspeaker and the base microphone respectively to the base receiver output and transmitter input, for providing a two-way voice connection between the headset and the telephone line.

15. A cordless handset telephone according to claim 9, including a battery charging compartment connected to the charging circuit, at least one auxiliary battery in mating engagement with the base charge contacts when the auxiliary battery is placed within the auxiliary battery charging compartment for charging the auxiliary battery, said auxiliary battery providing quick battery change capabilities for the headset.

16. A cordless headset telephone according to claim 11, including a handset connected to the base, an electronic directory/autodialler in operative engagement with said telephone number sending means, and telephone memory means connected to said directory/autodialler for dialing telephone numbers into said telephone line, stored in said memory means.

17. A cordless headset telephone according to claim 16, including a keypad connected to said directory/autodialler for entering and editing telephone numbers into said telephone memory means.

18. A cordless headset telephone according to claim 16, including an alphanumberic display for displaying names of parties and their respective telephone numbers stored in said memory means.

19. A cordless headset telephone according to claim 18, having a plurality of buttons in operative engagement with said directory/autodialler, including a redial button for redialing a telephone number, and a cancel button for cancelling a current line connection and reestablishing a new dial tone.

20. A cordless headset telephone according to claim 11, including a mute button in operative engagement with said microphone for providing privacy by muting outgoing audio signals.

21. A cordless headset telephone according to claim 2 including a telephone network in said headset being in operative engagement with said microphone, said earpiece and said number sending means.

22. A cordless headset telephone according to claim 2, having base telephone number sending means disposed in the base for sending telephone numbers into said telephone line.

23. A cordless headset telephone according to claim 22, wherein said base telephone number sending means includes a keypad for DTMF sending.

24. A cordless telephone system according to claim 1, including a headset switch mechanically linked to said microphone arm for disconnecting at least one headset circuit in response to said microphone arm being retracted.

25. A cordless headset telephone system comprising: a plurality of groups of headsets, each group including a respective plurality of headsets, each headset including a single earpiece and a microphone on one end portion of a curved headband having a quick-disconnect battery pack on the other end portion thereof, respectively connected to a headset receiver and a headset transmitter; a plurality of bases equal to said plurality of groups of headsets, each base including a respective base transmitter and base receiver, respectively tuned to the receivers and transmitters of a respective group of headsets, for providing a two-way cordless transmission channel between said base and each of the headsets of said respective group of headsets; and a forwardly extendable microphone arm and a headset switch linked to said microphone arm for disconnecting at least one circuit in said headset when the microphone arm is retracted.

26. A cordless telephone system according to claim 25 wherein said headset includes a curved headband.

* * * * *